(12) United States Patent
Varney et al.

(10) Patent No.: US 10,352,194 B2
(45) Date of Patent: Jul. 16, 2019

(54) DAMPER WITH ADJUSTABLE SEAL

(71) Applicant: United Technologies Corporation, Farmington, CT (US)

(72) Inventors: Philip Andrew Varney, Manchester, CT (US); Jason Husband, South Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/690,554

(22) Filed: Aug. 30, 2017

(65) Prior Publication Data
US 2019/0063261 A1    Feb. 28, 2019

(51) Int. Cl.
| | | |
|---|---|---|
| *F16C 19/06* | (2006.01) | |
| *F16C 33/10* | (2006.01) | |
| *F16C 27/00* | (2006.01) | |
| *F16C 33/66* | (2006.01) | |
| *F01D 25/16* | (2006.01) | |

(Continued)

(52) U.S. Cl.
CPC ......... *F01D 25/164* (2013.01); *F01D 11/003* (2013.01); *F01D 25/183* (2013.01); *F16C 19/06* (2013.01); *F16C 27/00* (2013.01); *F16C 27/045* (2013.01); *F16C 33/104* (2013.01); *F16C 33/6659* (2013.01); *F16F 15/0237* (2013.01); *F05D 2220/32* (2013.01); *F05D 2240/50* (2013.01); *F05D 2260/98* (2013.01); *F16C 2360/23* (2013.01)

(58) Field of Classification Search
CPC  F16C 27/045; F16C 33/1045; F16C 33/6659; F16C 33/6674; F16C 33/7859; F16C 33/7896; F16C 35/077; F16C 2360/23; F01D 25/164; F01D 25/183; F02C 7/06; F02C 7/28; F16F 15/0237; F16K 15/00; F05D 2220/32; F05D 2240/50; F05D 2260/96; F05D 2260/98
USPC ... 384/94, 99, 119, 130, 215, 581, 535, 537, 384/583; 415/170.1, 174.1, 174.3, 175; 277/377, 390, 413, 399
See application file for complete search history.

(56) References Cited

U.S. PATENT DOCUMENTS

| | | | | |
|---|---|---|---|---|
| 4,084,861 | A | * | 4/1978 | Greenberg ............ F01D 25/164 384/105 |
| 4,971,457 | A | * | 11/1990 | Carlson ................. F01D 25/164 384/581 |

(Continued)

FOREIGN PATENT DOCUMENTS

| | | |
|---|---|---|
| EP | 3067579 A1 | 9/2016 |
| FR | 2965858 A1 | 4/2012 |

OTHER PUBLICATIONS

Extended European Search Report for European Patent Application No. 18191838.4, dated Jan. 21, 2019, 7 pages.

*Primary Examiner* — Marcus Charles
(74) *Attorney, Agent, or Firm* — Kinney & Lange, P.A.

(57) ABSTRACT

A bearing assembly includes a case, a bearing spring positioned inside the case, a first seal positioned between the case and the bearing spring, and a second seal. The a second seal is positioned between the case and the bearing spring and is spaced apart from the first seal, wherein the second seal is an adjustable seal that is movable between a closed position and an opened position to inhibit or allow, respectively, a fluid to flow from a cavity that is defined by the case, the bearing spring, the first seal and the second seal.

17 Claims, 8 Drawing Sheets

(51) Int. Cl.
*F01D 25/18* (2006.01)
*F01D 11/00* (2006.01)
*F16F 15/023* (2006.01)
*F16C 27/04* (2006.01)

(56) References Cited

U.S. PATENT DOCUMENTS

| | | | | |
|---|---|---|---|---|
| 4,971,458 A * | 11/1990 | Carlson | ............ | F01D 25/164 384/581 |
| 5,067,825 A * | 11/1991 | Vance | ............ | F16F 15/0237 384/99 |
| 5,169,241 A * | 12/1992 | Singh | ............ | F01D 25/164 384/581 |
| 5,178,400 A | 1/1993 | Singh | | |
| 6,872,003 B2 * | 3/2005 | Dusserre-Telmon | ............ | F01D 25/164 384/99 |
| 7,517,152 B1 | 4/2009 | Walsh | | |
| 7,648,278 B2 * | 1/2010 | Stout | ............ | F16C 27/04 384/535 |
| 7,665,897 B2 * | 2/2010 | Alam | ............ | F01D 25/164 384/474 |
| 7,798,720 B1 * | 9/2010 | Walsh | ............ | F04D 29/126 384/99 |
| 8,182,153 B2 * | 5/2012 | Singh | ............ | F01D 25/164 384/477 |
| 9,488,071 B2 * | 11/2016 | Anglin | ............ | F16C 19/24 |
| 9,714,584 B2 * | 7/2017 | Morris | ............ | F01D 25/18 |
| 9,752,616 B2 * | 9/2017 | Saadi | ............ | F01D 25/16 |
| 2013/0108202 A1 * | 5/2013 | Do | ............ | F01D 25/164 384/572 |
| 2016/0160924 A1 * | 6/2016 | Meyers | ............ | F01D 25/164 384/474 |
| 2016/0369652 A1 * | 12/2016 | Morris | ............ | F01D 25/18 |
| 2017/0058697 A1 * | 3/2017 | Copeland | ............ | F01D 25/164 |

* cited by examiner

DAMPER WITH ADJUSTABLE SEAL

BACKGROUND

The present disclosure relates generally to gas turbine engines, and more particularly, to a bearing assembly in a gas turbine engine having a squeeze film damper.

A gas turbine engine typically includes a high pressure spool, a combustion system and a low pressure spool disposed within an engine case to form a generally axial, serial flow path about the engine centerline. The high pressure spool includes a high pressure turbine, a high pressure shaft extending axially forward from the high pressure turbine, and a high pressure compressor connected to a forward end of the high pressure shaft. The low pressure spool includes a low pressure turbine, which is disposed downstream of the high pressure turbine, a low pressure shaft, which typically extends coaxially through the high pressure shaft, and a low pressure compressor connected to a forward end of the low pressure shaft, forward of the high pressure compressor. The combustion system is disposed between the high pressure compressor and the high pressure turbine and receives compressed air from the compressors and fuel provided by a fuel injection system. A combustion process is carried out within the combustion system to produce high energy gases to produce thrust and turn the high and low pressure turbines, which drive the compressors to sustain the combustion process.

Gas turbine engines used in certain applications, such as helicopters and industrial power generation, include a third spool that is a power spool. The power spool includes a power turbine, which is disposed downstream of the low pressure turbine, and a power shaft, which typically extends forward coaxially through the high and low pressure shafts. The power shaft provides torque that can turn, for example, a rotor or a generator.

The high and low pressure spools as well as the power spool include alternating cascades of stators and rotors in order to work on the primary fluid in the flow path. Because the stators are stationary but the rotors rotate, bearings are necessary to permit the relative motion. In order to improve operation of the engine, squeeze film dampers may be included at the radial bearings in gas turbine engines. The squeeze film dampers may be supplied with a flow of viscous damping oil from a pressurized oil supply line in order to dampen vibration in the radial bearings. The oil film in a squeeze film damper also transmits vibration from the rotor to the bearing support structure, and therefore, to the structure supporting the gas turbine engine. The amount of damping and/or the amount of oil in the dampers may vary depending on the operational conditions of the gas turbine engine at a given time, as there may be different requirements for damping in certain conditions compared to other conditions.

SUMMARY

According to one embodiment of the present disclosure, a bearing assembly includes a case, a bearing spring positioned inside the case, a first seal positioned between the case and the bearing spring, and a second seal. The a second seal is positioned between the case and the bearing spring and is spaced apart from the first seal, wherein the second seal is an adjustable seal that is movable between a closed position and an opened position to inhibit or allow, respectively, a fluid to flow from a cavity that is defined by the case, the bearing spring, the first seal and the second seal.

According to another embodiment of the present disclosure, a method of pressurizing a bearing assembly includes supplying pressurized fluid to a thin film damper in the bearing assembly and operating a valve between a closed position and an opened position to inhibit or allow, respectively, the fluid to flow out of the thin film damper

DETAILED DESCRIPTION

Figure 1:
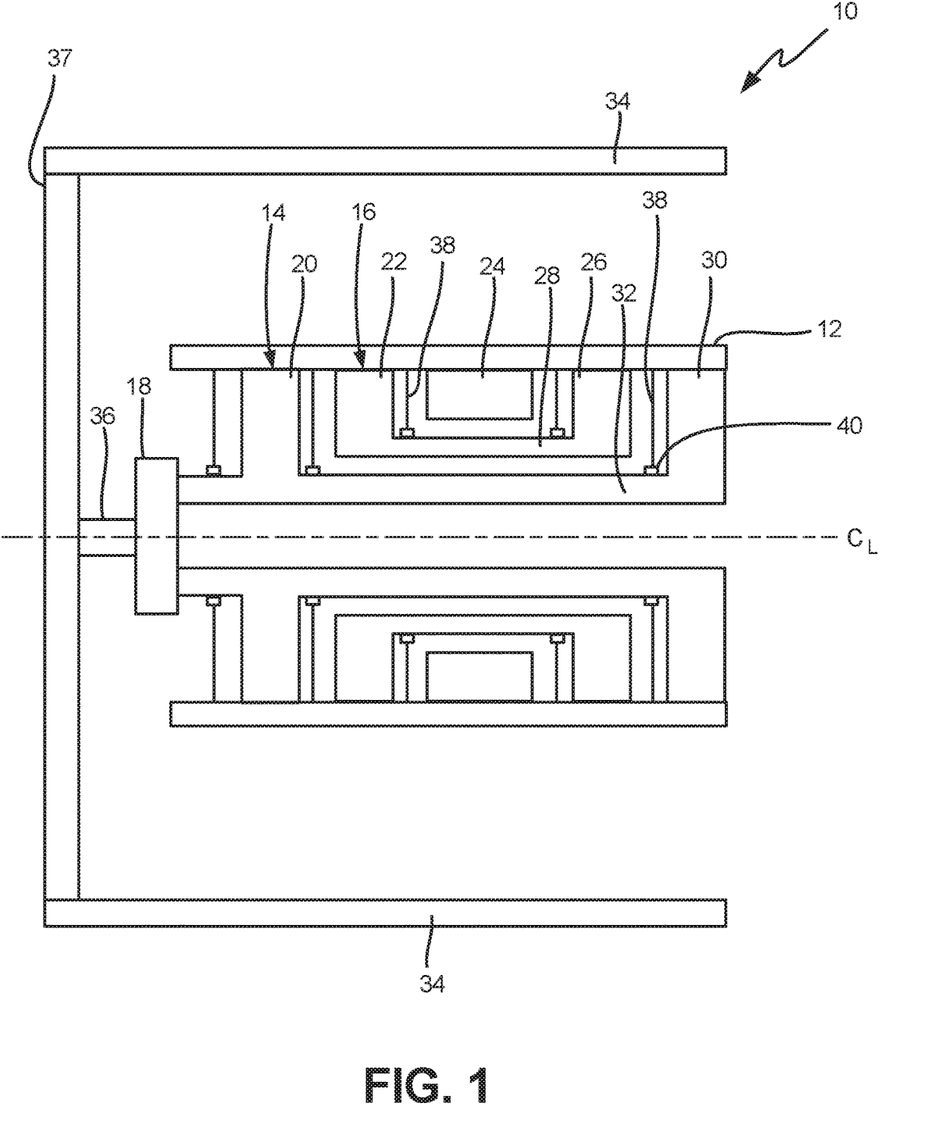
FIG. 1 is a schematic side cross-section view of a gas turbine engine including a plurality of bearing assemblies.

Referring first to FIG. 1, a schematic cross section of gas turbine engine 10 is shown. FIG. 1 depicts a gas turbine engine typically used for a fixed-wing aircraft. However gas turbine engine 10 can be an industrial power generator, helicopter, or other similar system incorporating rotor-supported, shaft-driven turbines (not shown). Shown in FIG. 1 are gas turbine engine 10, case 12, low spool 14, high spool 16, gear box 18, low pressure compressor (LPC) 20, high pressure compressor (HPC) 22, combustor 24, high pressure turbine (HPT) 26, high shaft 28, low pressure turbine (LPT) 30, low shaft 32, nacelle 34, fan shaft 36, fan 37, static members 38, bearing assemblies 40, and longitudinal engine centerline axis $C_L$.

In the illustrated embodiment, gas turbine engine 10 comprises a two-spool turboshaft engine, of which the operational principles are well known in the art, with case 12 that surrounds low spool 14 and high spool 16 which are each concentrically disposed around longitudinal engine centerline axis $C_L$. At the front of gas turbine engine 10 is LPC 20, and downstream of LPC 20 is HPC 22. Combustor 24 is downstream of HPC 22, and HPT 26 is downstream of combustor 24. HPT 26 is connected to HPC 22 via high shaft 28 to comprise high spool 16. LPT 30 is downstream of HPT 26, and LPT 30 is connected to LPC 20 via low shaft 32 to comprise low spool 14. Low shaft 32 extends concentrically through the interior of high shaft 28 and is connected to gear box 18. Fan shaft 36 extends forward from gearbox 18 and is connected to fan 37. Nacelle 34 surrounds the components of gas turbine engine 10, including fan 37.

While not shown in detail in FIG. 1, each of LPC 20, HPC 22, HPT 26, and LPT 30 are separated into static components and rotating components. The static components are connected to case 12, and the rotating components are connected to one of shafts 28, 32, and 36, respectively. Shafts 28, 32, and 36 are supported by a plurality of static members 38 (not all shown), and relative motion is allowed because each static member 38 connects to one of shafts 28, 32, and 36 through one of the plurality of bearing assemblies 40.

During normal operation, air enters case 12 and is compressed by LPC 20 and further compressed by HPC 22. The compressed air is delivered to combustor 24 along with fuel, and the mixture is combusted. The combustion process produces the high energy gases necessary to turn HPT 26 and LPT 30, which turn HPC 22 and LPC 20, respectively, thus sustaining the operation of gas turbine engine 10. LPC 20 also turns fan shaft 36 via gearbox 18 to rotate fan 37.

The components and configuration of gas turbine engine 10 as shown in FIG. 1 allow for air and fuel to be used to generate torque that can be used internally and externally to gas turbine engine 10. This is possible, in part, due to the plurality of bearing assemblies 40 which support and permit rotation of some components of gas turbine engine 10.

Figure 2A:
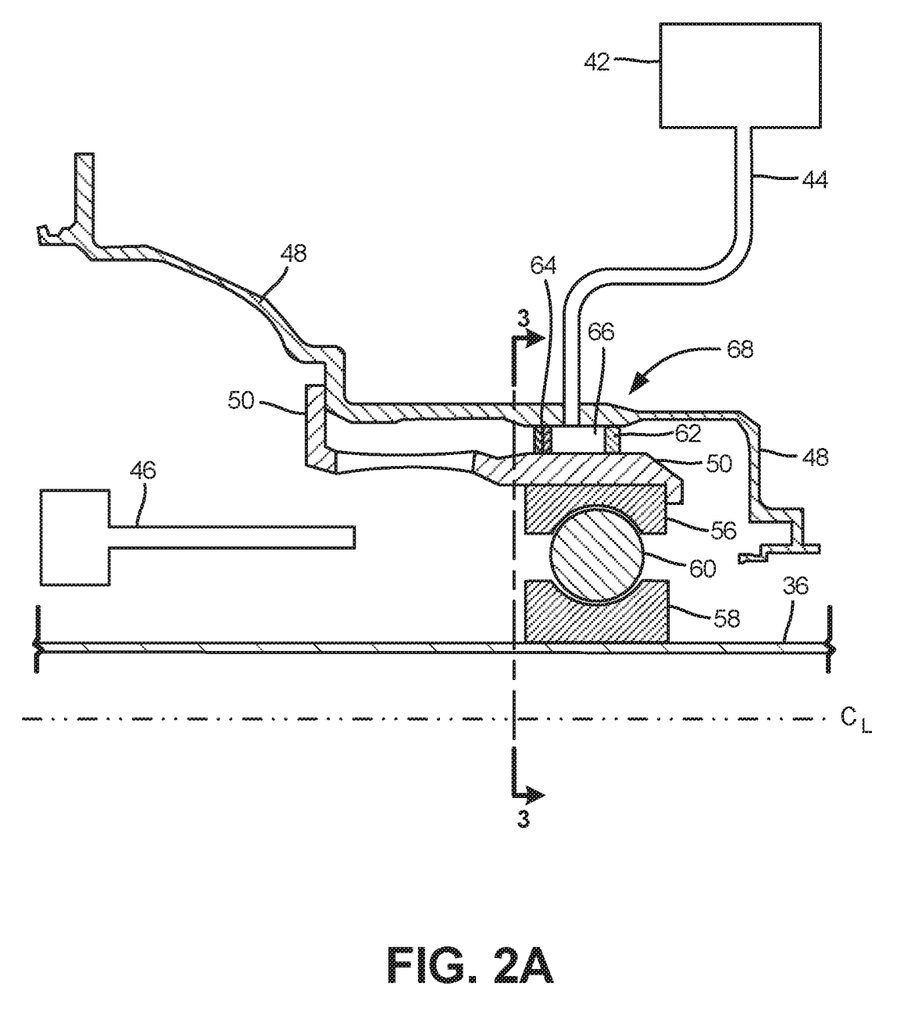
FIG. 2A is a schematic partial cross-sectional side view of one of the bearing assemblies of FIG. 1, with line 2A-2A in FIG. 2B denoting the cross section.
Figure 2B:
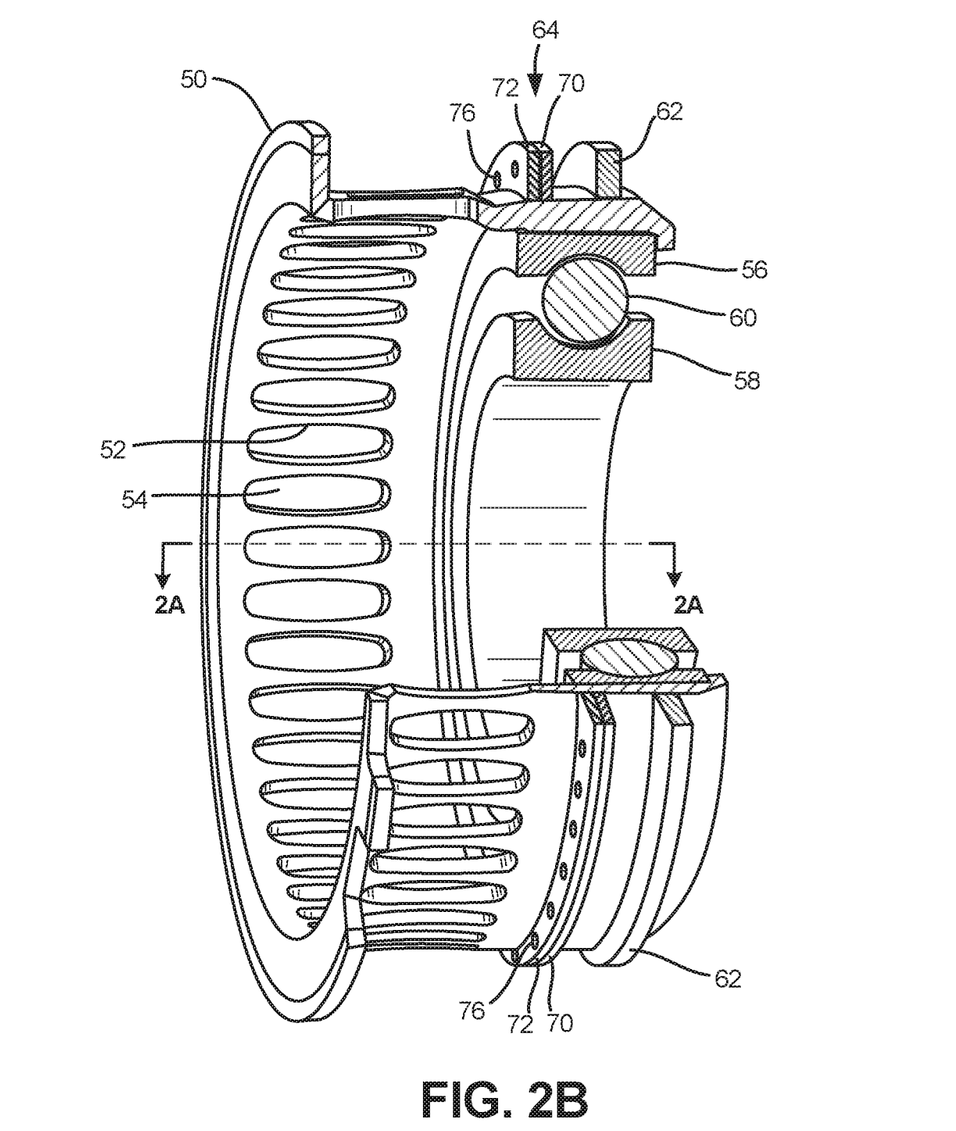
FIG. 2B is a cut-away perspective view of the bearing assembly of FIG. 2A including an adjustable seal.

Shown in FIG. 2A is a schematic partial cross-sectional side view of one of the bearing assemblies 40 of FIG. 1. In the illustrated embodiment, bearing assembly 40 is the fifth rearmost bearing assembly 40 of gas turbine engine 10 (shown in FIG. 1), although the depicted bearing assembly can represent any of bearing assemblies 40 in gas turbine engine 10. Furthermore, indications of direction such as "forward" and "rearward" are used in this discussion merely in reference to the embodiments described herein and are not intended to limit the invention. Shown in FIG. 2B is a cut-away perspective view of bearing assembly 40 of FIG. 2A, and FIGS. 2A and 2B will now be discussed simultaneously.

Shown in FIGS. 2A and/or 2B are power shaft 36, bearing assembly 40, pressurized source 42, supply line 44, and scavenge oil system 46, and longitudinal engine centerline axis $C_L$. In the illustrated embodiment, bearing assembly 40 includes bearing support case 48, bearing centering spring 50, first seal 62, second seal 64, cavity 66, bearing outer raceway 56, bearing inner raceway 58, and bearing elements 60.

Bearing centering spring 50, in the depicted embodiment, is a single, monolithic component that has a cylindrical body with a retaining feature at the forward end. Thereby, bearing centering spring 50 is attached at the forward end to the inside of bearing support case 48 and is cantilevered therefrom. Bearing centering spring 50 may be comprised of a ferrous metal material, such as M50 bearing steel.

Structurally, bearing centering spring 50 is comprised of a plurality of spring beams 52 and spring ports 54. In the particular embodiment shown, spring beams 52 and spring ports 54 are approximately evenly distributed around the periphery of bearing centering spring 50, with the total number and size of the spring beams 52 and spring ports 54 selected to provide the desired spring rate to support bearing assembly 40 in a particular embodiment. The spring rate of bearing centering spring 50 depends on many factors including the number and size of spring beams 52 and spring ports 54, and the material of its construction. Because of the physical appearance of bearing centering spring 50, it may be referred to as a "squirrel cage" spring.

Also shown in FIGS. 2A and/or 2B are bearing outer raceway 56, bearing inner raceway 58, bearing elements 60, first seal 62, second seal 64, first annular ring 70, and second annular ring 72. Bearing outer raceway 56 is connected to the inside of bearing centering spring 50 and contacts bearing elements 60. Bearing elements 60 also contact bearing inner raceway 58 which is connected to power shaft 36. Bearing centering spring 50 positions bearing assembly 40 to provide the proper alignment of power shaft 36 with longitudinal engine centerline axis $C_L$, while responding to shock and other forces that act against power shaft 36 via bearing outer raceway 56, bearing inner raceway 58 and bearing elements 60.

In the illustrated embodiment, first seal 62 is a non-adjustable seal and second seal 64 is an adjustable seal. First seal 62 and second seal 64 encircle bearing support spring 50 and are positioned proximate the rearward end of bearing centering spring 50, in the region near bearing elements 60. First seal 62 may be, for example, a piston ring seal that extends between bearing centering spring 50 and bearing support case 48. On the other hand, second seal 64 is a valve that comprises first annular ring 70 and second annular ring 72 which extend between bearing centering spring 50 and bearing support case 48. Second seal 64 is configurable to be closed or opened (which includes both fully opened and partially opened), and some possible configurations of second seal 64 and the operation thereof will be discussed in greater detail later, with respect to subsequent figures. In other embodiments, first seal 62 may be an adjustable seal instead of second seal 64, or first seal 62 and second seal 64 may both be adjustable seals.

Cavity 66 is formed between bearing support case 48, bearing centering spring 50, first seal 62, and second seal 64 within bearing assembly 40. Cavity 66 is fluidly connected to pressurized source 42, supply line 44, second seal 64, and scavenge oil system 46. Squeeze film damper 68 is defined by bearing centering spring 50, bearing support case 48, first seal 62, second seal 64, and viscous damping oil in cavity 66. For damping to occur, fluid (not shown) is supplied from pressurized source 42 via supply line 44 into cavity 66 with second seal 64 being closed. In some embodiments, the fluid employed is "viscous damping oil" because mechanical damping is influenced by the viscosity of the damping fluid.

During operation of gas turbine engine 10 (shown in FIG. 1), when cavity 66 includes fluid from pressurized source 42, some of the fluid weeps out of cavity 66 by flowing past first seal 62 and second seal 64 where first seal 62 and second seal 64 make contact with bearing center spring 50 and/or bearing support case 48. Any fluid weepage is collected by scavenge oil system 46 and returned to an oil handling system (not shown; which may supply pressurized source 42 with the fluid). The functionality of squeeze film damper 68 is dependent on the supply of pressurized fluid in order for damping action to occur. Without such a supply, cavity 66 would depressurize and squeeze film damper 68 would provide little or no damping of the associated bearing assembly 40. Therefore, under some operating conditions of gas turbine engine 10 (shown in FIG. 1), the flow rate of pressurized fluid into cavity 66 is approximately equal to the weepage rate of fluid past first seal 62 and second seal 64. Such maximum pressurization of damping oil within cavity 66 generally results in maximum damping action by squeeze film damper 68.

At other operating conditions of gas turbine engine 10 (shown in FIG. 1), it can be advantageous to depressurize cavity 66. In such situations, second seal 64 is opened, allowing the fluid in cavity 66 to flow out of cavity 66 in a controlled manner that is significantly faster than the weepage that normally occurs when second seal 64 is closed. By adjusting the degree to which second seal is opened, the degree of damping and the vibration transmission provided by squeeze film damper 68 is controlled. Adjusting the degree of damping and vibration transmission of gas turbine engine 10 throughout a full range of operating conditions may allow for reduced vibration, reduced cyclic fatigue on engine structural components, reduced radiated noise, increased engine lifetime, improved engine performance, and greater fuel efficiency.

Figure 3:
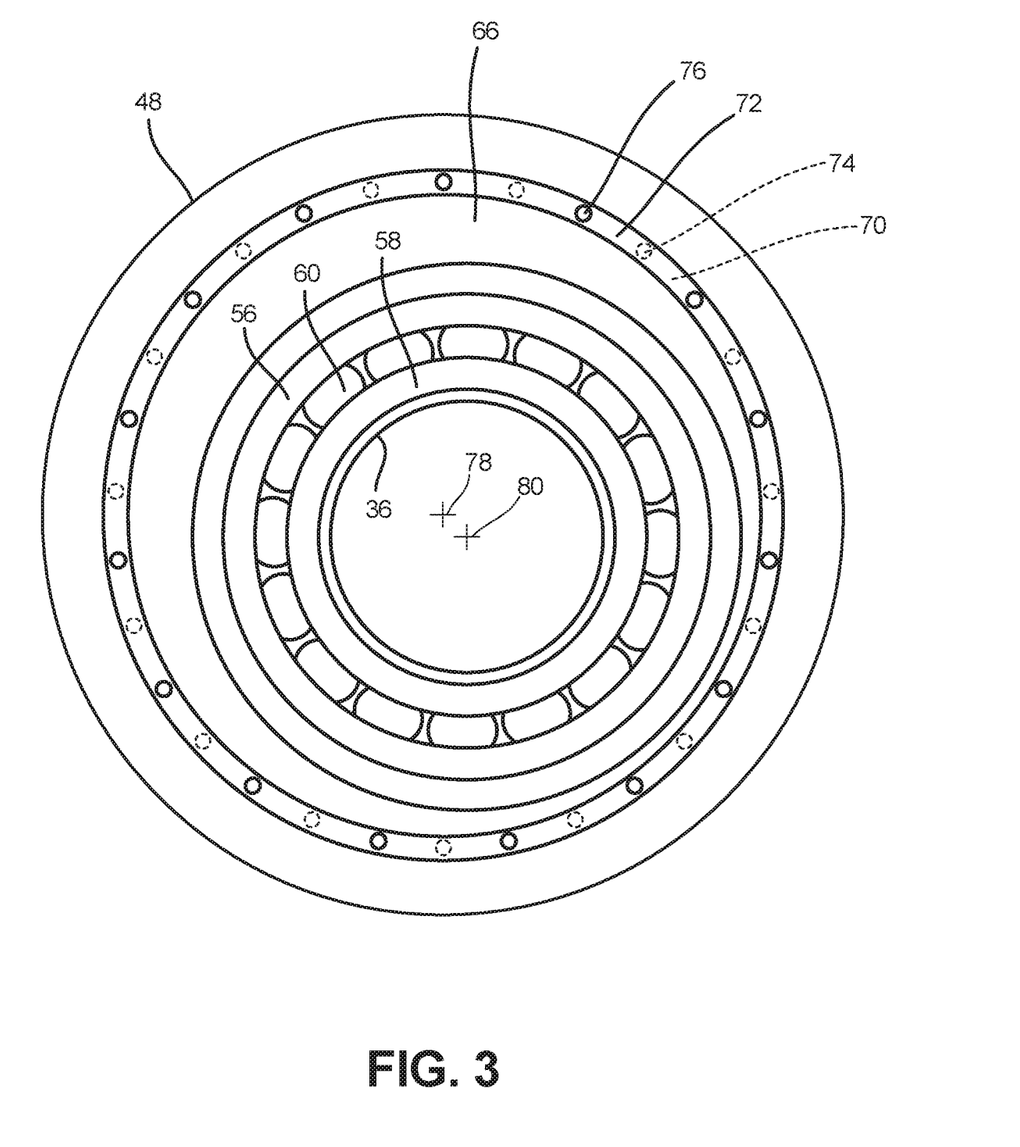
FIG. 3 is a schematic partial cross-sectional end view of the bearing assembly of FIG. 2A, with line 3-3 in FIG. 2A denoting the cross section.

Next, referring to FIG. 3, a schematic partial cross-sectional end view of the bearing assembly 40 of FIG. 2A is shown. Shown in the illustrated embodiment is power shaft 36, bearing outer raceway 56, bearing inner raceway 58, a plurality of bearing elements 60, bearing centering spring 50, cavity 66, first annular ring 70, second annular ring 72, a plurality of first ports 74, a plurality of second ports 76, and bearing support case 48.

The benefits of squeeze film damping exist because modern gas turbine engines operate at high rotational speeds, which may exceed 20,000 rpm in some designs, and despite high precision modern manufacturing methods, vibrations can be generated during operation as a result of minor imbalances that exist throughout the rotating components in gas turbine engine 10 (shown in FIG. 1). Such vibrations may be caused by a transient misalignment between axial center 78 of bearing assembly 40 and axial center 80 of power shaft 36, one example of which is depicted in an exaggerated manner for illustrative purposes. The misalignment may change in location, speed, and direction rapidly, sending vibrations through bearing assembly 40 to the rest of gas turbine engine 10 and the surrounding environment. Vibration of gas turbine engine 10 has several detrimental effects which designers seek to minimize including cyclic fatigue and noise. Squeeze film dampers 68 are therefore used to reduce the vibration of gas turbine engine 10, thereby helping mitigate the detrimental effects of engine vibration.

In the illustrated embodiment, first ports 74 and second ports 76 are circularly-shaped holes that extend through first annular ring 70 and second annular ring 72, respectively. More specifically, first ports 74 are identical and evenly spaced around first annular ring 70, and second ports 76 are identical and evenly spaced around second annular ring 72. As depicted in FIG. 3, first ports 74 are offset from second ports 76 such that there is no overlap therebetween. However, second annular ring 72 is circumferentially movable relative to first annular ring 70 about bearing centering spring 50, so second annular ring 72 can be positioned relative to first annular ring 70 such that first ports 74 overlap with second ports 76. Such a configuration creates orifices 82, which are the intersections of first ports 74 and second ports 76. In this condition second seal 64 may be referred to as being opened, allowing fluid to flow from cavity 66 (shown in FIG. 2A). As the fluid flows from cavity 66, the fluid pressure within cavity 66 decreases, resulting in less damping action.

When second annular ring 72 moves circumferentially relative to first annular ring 70 to the point of maximum alignment between first ports 74 and second ports 76, orifices 82 are at their largest size. Therefore, orifices 82 provide maximum area for flow, thereby allowing the greatest flow of fluid from cavity 66. Under this condition, second seal 64 is fully open, which may depressurize cavity 66 (depending on the fluid flow rate in through supply line 44, if any (shown in FIG. 2A)), thereby resulting in minimal (or complete lack of) damping.

Figure 4A:
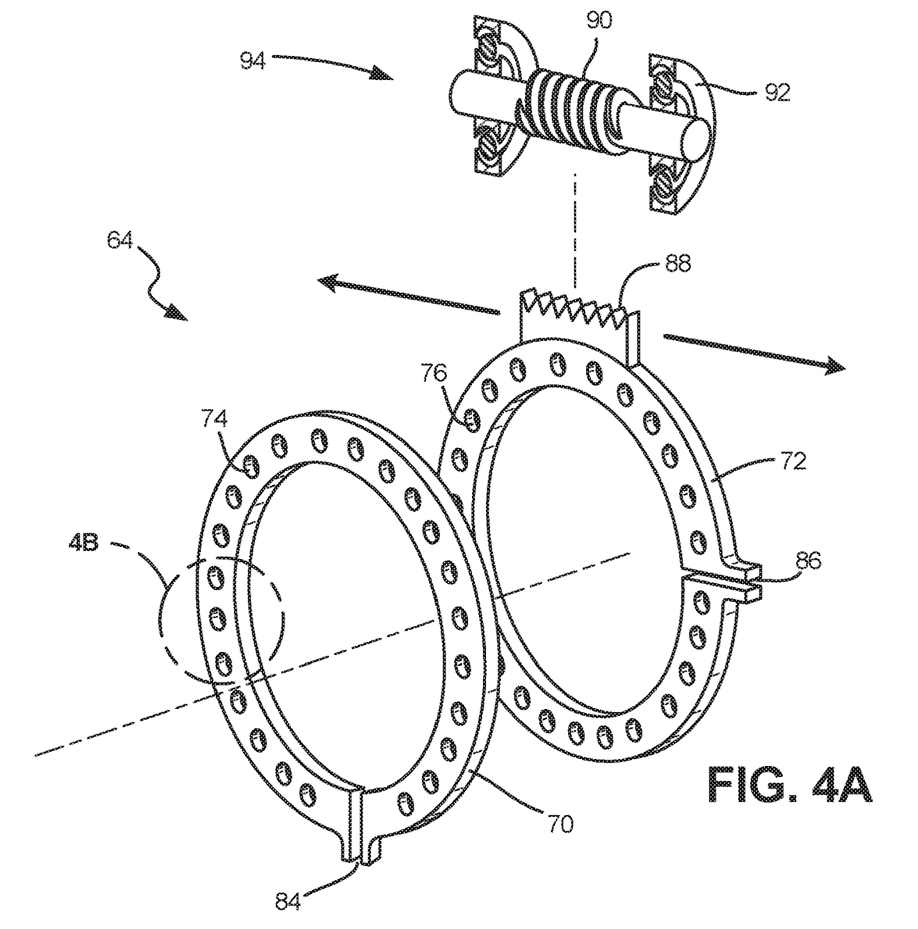
FIG. 4A is an exploded perspective view of an embodiment of the adjustable seal of FIG. 2A, including the first and second annular rings and the worm gear drive mechanism.
Figure 4B:
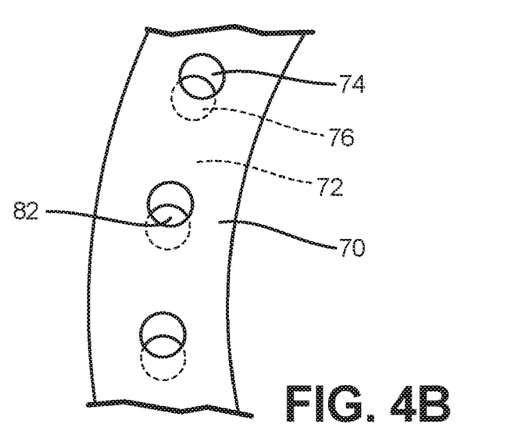
FIG. 4B is a partial end view of the first and second annular rings of FIG. 4A wherein the adjustable seal is assembled.

Next, referring to FIG. 4A, an exploded perspective view an embodiment of the adjustable seal of FIG. 2A is shown. Depicted in FIG. 4A is second seal 64, being comprised of first annular ring 70, second annular ring 72, a plurality of first ports 74, a plurality of second ports 76, first split 84, second split 86, valve positioning teeth 88, worm gear 90, rotary motor 92, and valve positioning system 94. FIG. 4B is a partial end view of the first annular ring 70 and second annular ring 72 of FIG. 4A in an assembled condition. FIGS. 4A and 4B will be discussed simultaneously.

In the illustrated embodiment, first split 84 and second split 86 provide for the installation of first annular ring 70 and second annular ring 72, respectively, during the assembly process of gas turbine engine 10. In alternative embodiments, a different means may be provided to facilitate the installation of first annular ring 70 and second annular ring 72 during the assembly process of gas turbine engine 10.

Figure 5:
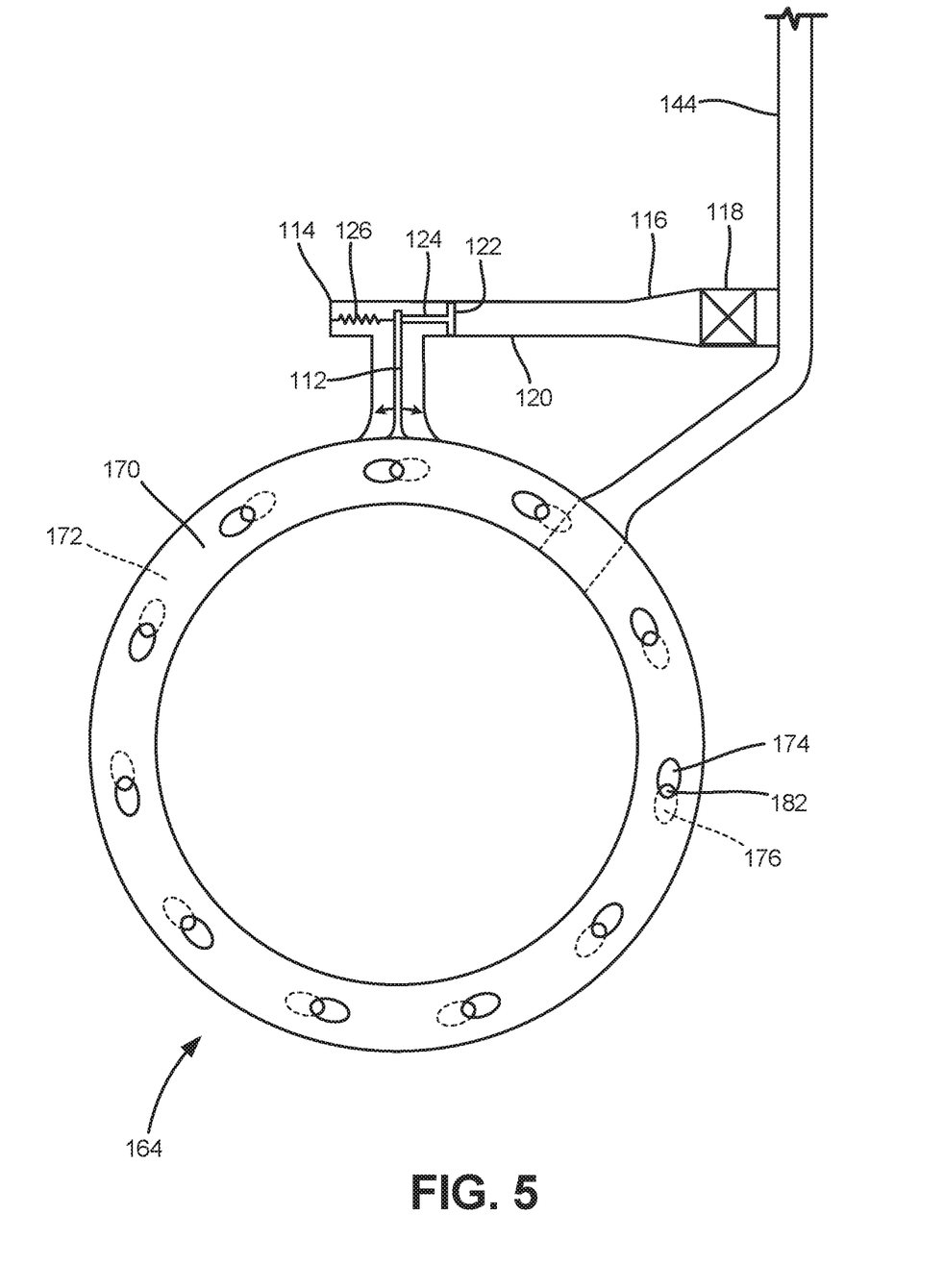
FIG. 5 is an end view schematic of an alternate embodiment of the adjustable seal including a linear mechanical motor actuator.

As shown in FIG. 4B, a face of first annular ring 70 is operably engaged against a face of second annular ring 72. First ports 74 and second ports 76 are partially aligned, thereby forming orifices 82 at the intersection of each of first ports 74 and second ports 76. In other embodiments, for example, as shown in FIG. 5, first ports 74 and/or second ports 76 may have geometric shapes other than circular, including but not limited to oval, square, rectangular, and triangular shapes. Moreover, first ports 74 may have a shape different from that of second ports 76.

In the illustrated embodiment, valve positioning system 94 is comprised of rotary motor 92, worm gear 90, and valve positioning teeth 88 disposed on second annular ring 72. Rotary motor 92 drives worm gear 90, which operably engages valve positioning teeth 88, thereby translating the rotation of worm gear 90 into a circumferential motion of second annular ring 72 when rotary motor 92 is energized. When rotary motor 92 rotates in one direction, the size of orifices 82 is increased as explained above. When rotary motor 92 is held stationary, the size of orifices 82 will remain fixed. Similarly, when rotary motor 92 rotates in the opposite direction, the size of orifices 82 is decreased, and may be eliminated is second annular ring 72 is rotated sufficiently. In such a closed condition, first ports 74 are occluded by second annular ring 72, and second ports 76 are occluded by first annular ring 70.

Rotary motor 92 is controlled by a valve positioning control system (not shown). In one embodiment, rotary motor 92 may be operated by electricity. In another embodiment, rotary motor 92 may be hydraulically or pneumatically operated. In a particular embodiment, the valve positioning control system may interface to a Full Authority Digital Engine Control (FADEC) computer (not shown) that calculates the degree of damping that is desired, thereby calculating the desired size of orifices 82 and commanding the response of the valve positioning system 94 as described above. The degree of damping desired may be based on a variety of operating parameters. Examples of such operating parameters include, without limitation, rotational speed of gas turbine engine 10 (shown in FIG. 1), temperature, altitude, and flight phase such as idle, take-off, cruising, etc. Moreover, override controls may be commanded into the control system by the aircraft crew or other system, for example, when it may be desirable to alter the degree of damping to control the radiated noise into the aircraft or for testing. In another embodiment, valve positioning system 94 may follow a schedule that is programmed to respond to only a single parameter, for example, rotational speed of gas turbine engine 10. Any means of calculating and controlling the size of orifices 82 is within the scope of the present disclosure.

Referring next to FIG. 5, a schematic view depicting an alternative embodiment of valve positioning system 194 for second seal 164. Depicted in FIG. 5 is second seal 164, first annular ring 170, first ports 174, second annular ring 172, second ports 176, orifices 182, supply line 144, positioning arm 112, linear actuator 114, actuator supply line 116, valve 118, actuator cylinder 120, actuator piston 122, piston rod 124, and actuator spring 114. Depicted in the alternative embodiment shown, first ports 174 and second ports 176 are oval in cross sectional shape. The resulting cross-sectional shape of orifices 182 will vary depending on the overlap of first ports 174 and second ports 176, which in turn also depends on the shape of first ports 174 and second ports 176.

Second annular ring 172 is operably engaged by positioning arm 112, which is in turn moved by linear actuator 114. In the illustrated embodiment, linear actuator 114 is hydraulic, being comprised of actuator piston 122 and actuator cylinder 120. Actuator piston 122 is operably connected to positioning arm 112 by piston rod 124, while actuator spring 126 provides a bias force against positioning arm 112. Actuator supply line 116 delivers hydraulic pressure from supply line 144 to actuator piston 122. As the pressure in supply line 144 increases, a greater hydraulic pressure is transferred via actuator supply line 116 to act on actuator piston 122, which imparts motion to piston rod 124 and to positioning arm 112, thereby circumferentially moving second annular ring 172 while also compressing actuator spring 126. This action opens or further opens orifices 82.

Valve 118 may be used to isolate actuator supply line 116 from supply line under some conditions, if desired. Valve 118 may also be selected to perform other actions, such as providing pressure relief. As supply pressure decreases, a lower pressure acts on actuator piston 122, thereby allowing actuator spring 126 to impart motion to positioning arm 112 in the reverse direction to that described earlier. In turn, second annular ring 172 moves circumferentially in the reverse direction to that described above, reducing or closing orifices 82. Accordingly, valve positioning system 194 adjusts the size of orifices 182 in response to the hydraulic pressure in supply line 144, thereby adjusting the degree of damping as described in FIGS. 2A and 2B.

In the illustrated embodiment, supply line 144 may be supplied by a source of pressurized oil from an oil pump that is driven by low spool 14, high spool 16, or power spool 18 (shown in FIG. 1). As gas turbine engine 10 (shown in FIG. 1) speed increases, oil pressure in supply line 144 increases. Therefore, the degree of damping provided to bearing 40 increases in response to the speed increase of gas turbine engine 10 (shown in FIG. 1). In other embodiments, the operation of linear actuator 114 in response to increasing hydraulic pressure in supply line 144 may be reversed to that described above, thereby decreasing the amount of damping of bearing 40 as the speed of gas turbine engine 10 increases.

Moreover, in yet another embodiment, the pressure in actuator supply line 116 may be controlled by a valve positioning control system (not shown), with the valve positioning control system controlling the hydraulic pressure in actuator supply line 116 in response to a plurality of operating parameters as described above with respect to FIGS. 4A and 4B.

Figure 6:
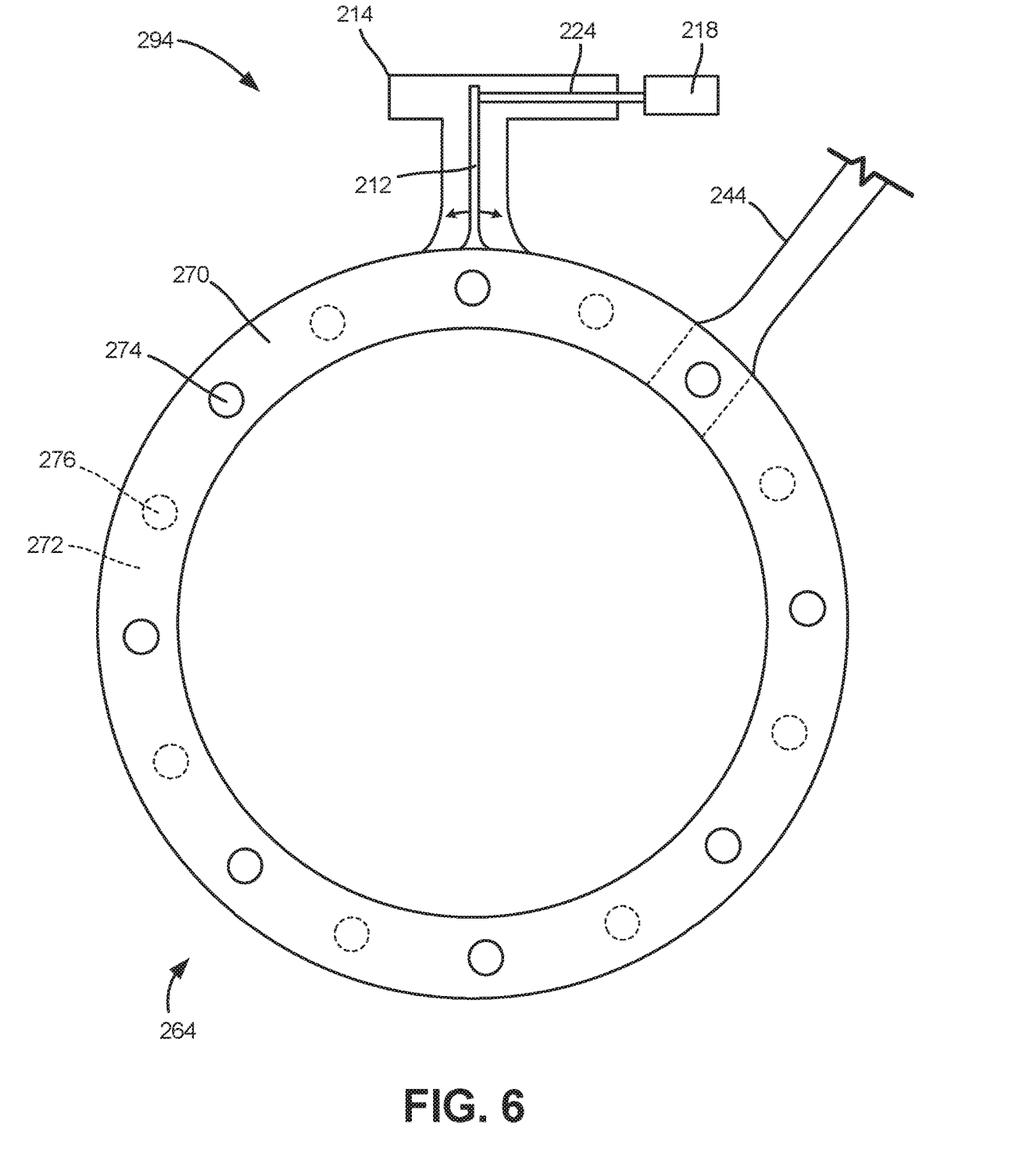
FIG. 6 is an end view schematic of another alternate embodiment of the adjustable seal including a linear electrical motor actuator.

Next, referring to FIG. 6, a schematic view depicting another alternative embodiment of valve positioning system 294 for second seal 264 is shown. Depicted in FIG. 6 is supply line 244, second seal 264, first annular ring 270, second annular ring 272, first ports 274, second ports 276, positioning arm 212, linear actuator 214, actuator linkage 224, and piezoelectric element 218. First ports 274 and second ports 276 are depicted as circular in cross sectional shape, for simplicity. Second annular ring 272 is in a position relative to first annular ring 270 such that there is no overlap between first ports 274 and second ports 276. Second annular ring 272 is operably engaged by positioning arm 212, which is in turn moved by linear actuator 214. In the illustrated embodiment, linear actuator 214 is moved by piezoelectric element 218 in response to an electrical signal from the valve positioning control system (not shown). As the voltage supplied to piezoelectric element 218 of linear actuator 214 increases, piezoelectric element 218 expands, thereby imparting a motion to positioning arm 212 via actuator linkage 224. Positioning arm 212 circumferentially moves second annular ring 272 relative to first annular ring 270, thereby resulting in a similar response to second seal 264 (as shown in FIG. 5), and accordingly, the degree of damping of bearing 40 as explained above with respect to FIG. 5. Conversely, a reduced voltage applied to piezoelectric element 218 causes piezoelectric element 218 to contract, thereby imparting a reverse motion on linear actuator 214, which in turns moves second annular ring 272 circumferentially in the opposite direction via actuator linkage 224.

In other embodiments, motion elements different from a piezoelectric element 218 may be used in linear actuator 214. For example, a linear electromechanical motor may be used. Any means of positioning second annular ring by means of an actuator to control second seal 264 is within the scope of the present disclosure.

Figure 7:
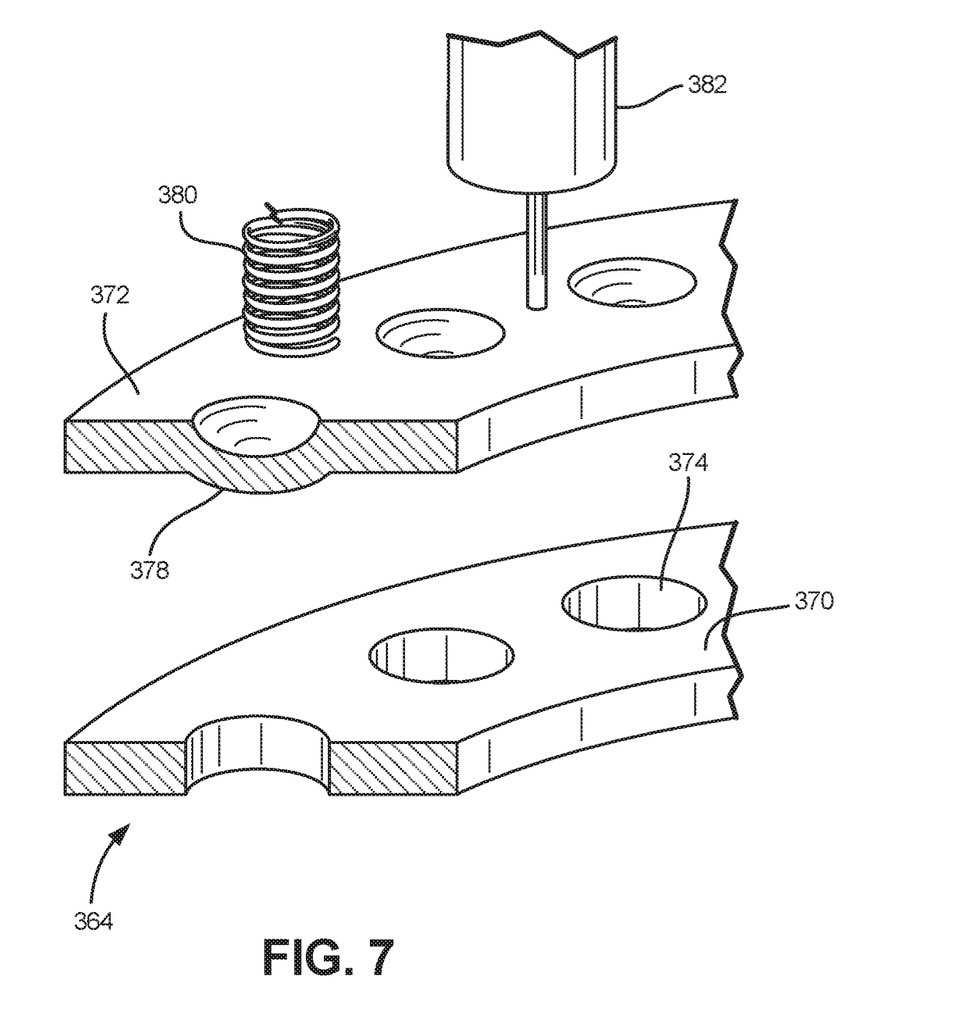
FIG. 7 is a schematic cut-away perspective view of another alternate embodiment of the adjustable seal including an axially-movable second annular ring.

Finally, referring to FIG. 7, a schematic cut-away partial view depicting an alternative embodiment of second seal 364. Shown in FIG. 7 is second seal 364, first annular ring 370, first ports 374, second annular ring 372, mounds 378, spring 380, and ring actuator 382.

In the illustrated embodiment, second annular ring 372 is axially moveably relative to first annular ring 370 by ring actuator 382. Spring 380 applies a bias force to second annular ring 372, pushing second annular ring 372 axially against first annular ring 370. Mounds 378 in second annular ring 372 are aligned with first ports 374, and when second annular ring 372 is in full contact (i.e., when second seal 364 is closed), mounds 378 occlude first ports 374. This prevents the flow of fluid from cavity through first ports 374 by the operable engagement of mounds 378 and first ports 374. In a manner similar to that described under FIGS. 2A and 2B, maximum damping is provided when damping fluid is prevented from flowing from the cavity through second seal 364. Ring actuator 382 moves second annular ring 372 axially away from first annular ring 370, thereby operably disengaging mounds from first ports 374. This allows the flow of fluid from the cavity through second annular ring 372. As damping fluid flows through first ports 374, the fluid pressure in the cavity decreases, thereby resulting in less damping.

Ring actuator 382 may be an electrical, hydraulic, or pneumatic mechanical component. Ring actuator 382 may be controlled by valve positioning control system (not shown), which in turn may be controlled by any of a variety of methods as described above under FIG. 4.

In another embodiment, a plurality of springs 380 may be used on second annular ring 372, and/or a plurality of ring actuators 382 may be used on second annular ring 372. In an alternative embodiment, spring 380 may not exist and ring actuator 382 may be used entirely to position second annular ring 372 axially relative to first annular ring 370, thereby controlling the operable engagement of mounds 378 with first ports 374.

In yet another embodiment, ring actuator 382 may not be used, instead utilizing only the bias force of spring 380 on second annular ring 372 to operably engage mounds 378 with first ports 374. As hydraulic pressure in the cavity increases, a greater axial force is applied to second annular ring 372 as a result of the fluid pressure acting on the cross-sectional area of mounds 378 so exposed to the hydraulic pressure. The resulting greater axial force applied to second annular ring 372 will move second annular ring 372 axially away from first annular ring 370, against the bias force of spring 380, thereby allowing a greater effective cross-sectional area for damping fluid to flow through first ports 374 past mounds 378. By selecting appropriate shapes and sizes of first ports 374 and mounds 378, and the appropriate bias force of spring 380, variable damping that responds to cavity hydraulic pressure may be designed into squeeze film damper 68 (shown in FIG. 2A). Moreover, by utilizing a plurality of different features for first ports 374 and mounds 378, and a plurality of springs 380 having sequentially increasing bias forces as a result of different spring rates, a damping schedule may be designed over a wide operating range of cavity hydraulic pressures.

Discussion of Possible Embodiments

The following are non-exclusive descriptions of possible embodiments of the present invention.

A bearing assembly according to an exemplary embodiment of this disclosure, among other possible things, includes a case; a bearing spring positioned inside the case; a first seal positioned between the case and the bearing spring; and a second seal positioned between the case and the bearing spring and spaced apart from the first seal, wherein the second seal is an adjustable seal that is movable between a closed position and an opened position to inhibit or allow, respectively, a fluid to flow from a cavity that is defined by the case, the bearing spring, the first seal and the second seal.

The bearing assembly of the preceding paragraph can optionally include, additionally and/or alternatively, any one or more of the following features, configurations and/or additional components:

A further embodiment of the foregoing bearing assembly, wherein the second seal is a valve, wherein the valve comprises a first annular ring and a second annular ring, and wherein the second annular ring is moveable relative to the first annular ring.

A further embodiment of any of the foregoing bearing assemblies, wherein the second annular ring is circumferentially moveable with respect to the first annular ring to change the second seal position between a closed position and an open position A further embodiment of any of the foregoing bearing assemblies, wherein the first annular ring includes at least one first annular ring port, and wherein the at least one first annular ring port is occluded by the second annular ring when the second seal is in the closed position A further embodiment of any of the foregoing bearing assemblies, wherein the second annular ring includes at least one second annular ring port, and wherein the at least one second annular ring port at least partially aligns with the at least one first annular ring port second seal is in the opened position A further embodiment of any of the foregoing bearing assemblies, wherein the second annular ring is axially moveable with respect to the first annular ring to change the second seal position between a closed position and an open position.

A further embodiment of any of the foregoing bearing assemblies, wherein the first annular ring includes at least one first annular ring port, and wherein the at least one first annular ring port is occluded by the second annular ring when the second seal is in the closed position.

A further embodiment of any of the foregoing bearing assemblies, wherein the second annular ring includes at least one second annular ring mound, and wherein the at least one second annular ring mound is spaced apart from the at least one first annular ring port when the second seal is in the opened position.

A further embodiment of any of the foregoing bearing assemblies, wherein the second annular ring is moved by an actuator.

A further embodiment of any of the foregoing bearing assemblies, further comprising at least one spring, wherein the at least one spring applies an axial bias force on the second annular ring approximately in the direction of the first annular ring.

A further embodiment of any of the foregoing bearing assemblies, wherein the second annular ring is actuated by a motor.

A further embodiment of any of the foregoing bearing assemblies, wherein the motor is a rotary motor, and wherein the rotary motor operably engages a coupling on the second annular ring.

A further embodiment of any of the foregoing bearing assemblies, wherein the motor is a linear motor, and wherein the linear motor operably engages a coupling on the second annular ring.

A further embodiment of any of the foregoing bearing assemblies, wherein the bearing spring is in contact with case, and wherein the contact is at the distal end of the adjustable seal.

A gas turbine engine comprising the foregoing bearing assembly.

A further embodiment of the foregoing bearing assembly, wherein the first seal is another adjustable seal that is movable between another closed position and another opened position to inhibit or allow, respectively, the fluid to flow from the cavity.

A method of pressurizing the foregoing bearing assembly, consisting of supplying pressurized fluid to a thin film damper in the bearing assembly; and operating a valve between a closed position and an opened position to inhibit or allow, respectively, the fluid to flow out of the thin film damper.

The method of the preceding paragraph can optionally include, additionally and/or alternatively, any one or more of the following features, configurations and/or additional components:

A further embodiment of the foregoing method, wherein operating the valve comprises moving a second annular ring relative to a first annular ring.

A further embodiment of any of the foregoing methods, wherein operating the valve comprises moving a second annular ring relative to a first annular ring in a circumferential direction.

A further embodiment of any of the foregoing methods, wherein operating the valve comprises moving a second annular ring relative to a first annular ring in an axial direction.

An adjustable seal end according to an exemplary embodiment of this disclosure, among other possible things, includes a first seal ring comprising a first annular body that extends along an axis, the first annular body having a first annular face; and a first port that extends through the first annular face; and a second seal ring comprising a second annular body that extends along the axis, the second annular body having a second annular face; wherein the second annular face is in contact with the first annular face and completely occludes the first port when the adjustable end seal is in a closed position; and wherein the second annular face does not completely occlude the first port when the adjustable end seal is in a partially opened position.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A bearing assembly comprising:
a case;
a bearing spring positioned inside the case;
a first seal positioned between the case and the bearing spring; and
a second seal positioned between the case and the bearing spring and spaced apart from the first seal;
wherein:
the second seal is a valve comprising a first annular ring and a second annular ring;
the second annular ring is moveable relative to the first annular ring; and
the valve is movable between a closed position and an opened position to inhibit or allow, respectively, a fluid to flow from a cavity that is defined by the case, the bearing spring, the first seal and the second seal.

2. The bearing assembly of claim 1, wherein the second annular ring is circumferentially moveable with respect to the first annular ring to change the second seal position between a closed position and an open position.

3. The bearing assembly of claim 2, wherein the first annular ring includes at least one first annular ring port, and wherein the at least one first annular ring port is occluded by the second annular ring when the second seal is in the closed position.

4. The bearing assembly of claim 3, wherein the second annular ring includes at least one second annular ring port, and wherein the at least one second annular ring port at least partially aligns with the at least one first annular ring port second seal is in the opened position.

5. The bearing assembly of claim 1, wherein the second annular ring is axially moveable with respect to the first annular ring to change the second seal position between a closed position and an open position.

6. The bearing assembly of claim 4, wherein the first annular ring includes at least one first annular ring port, and wherein the at least one first annular ring port is occluded by the second annular ring when the second seal is in the closed position.

7. The bearing assembly of claim 6, wherein the second annular ring includes at least one second annular ring mound, and wherein the at least one second annular ring mound is spaced apart from the at least one first annular ring port when the second seal is in the opened position.

8. The bearing assembly of claim 7, wherein the second annular ring is moved by an actuator.

9. The bearing assembly of claim 7, further comprising at least one spring, wherein the at least one spring applies an axial bias force on the second annular ring approximately in the direction of the first annular ring.

10. The bearing assembly of claim 1, wherein the second annular ring is actuated by a motor.

11. The bearing assembly of claim 10, wherein the motor is a rotary motor, and wherein the rotary motor operably engages a coupling on the second annular ring.

12. The bearing assembly of claim 10, wherein the motor is a linear motor, and wherein the linear motor operably engages a coupling on the second annular ring.

13. The bearing assembly of claim 1, wherein the bearing spring is in contact with case, and wherein the contact is at the distal end of the valve.

14. A gas turbine engine comprising the bearing assembly of claim 1.

15. The bearing assembly of claim 1, wherein the first seal is an adjustable seal that is movable between another closed position and another opened position to inhibit or allow, respectively, the fluid to flow from the cavity.

16. A method of pressurizing a bearing assembly that comprises a case, a bearing spring positioned inside the case, a first seal positioned between the case and the bearing spring, and a second seal positioned between the case and the bearing spring and spaced apart from the first seal, wherein the second seal is a valve comprising a first annular ring and a second annular ring, the second annular ring is moveable relative to the first annular ring, the valve is movable between a closed position and an opened position to inhibit or allow, respectively, a fluid to flow from a cavity that is defined by the case, the bearing spring, the first seal and the second seal, the method comprising:
supplying pressurized fluid to a cavity in the bearing assembly; and
operating the valve between a closed position and an opened position to inhibit or allow, respectively, the fluid to flow out of the cavity.

17. The method of claim 16, wherein the second annular ring is moveable relative to the first annular ring in a direction selected from the group consisting of circumferential direction and axial direction.

* * * * *